United States Patent
Niergarth et al.

(10) Patent No.: US 11,981,419 B2
(45) Date of Patent: *May 14, 2024

(54) METHOD AND SYSTEM FOR INTEGRATED PITCH CONTROL MECHANISM ACTUATOR HYDRAULIC FLUID TRANSFER

(71) Applicant: General Electric Company, Schenectady, NY (US)

(72) Inventors: Daniel Alan Niergarth, Cincinnati, OH (US); Darek Tomasz Zatorski, Fort Wright, KY (US); Christopher James Kroger, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/560,544

(22) Filed: Dec. 23, 2021

(65) Prior Publication Data
US 2022/0112902 A1 Apr. 14, 2022

Related U.S. Application Data

(62) Division of application No. 16/532,905, filed on Aug. 6, 2019, now Pat. No. 11,221,017, which is a division
(Continued)

(51) Int. Cl.
*B64C 11/38* (2006.01)
*F02K 3/06* (2006.01)
(Continued)

(52) U.S. Cl.
CPC ............... *B64C 11/38* (2013.01); *F02K 3/06* (2013.01); *F04D 29/325* (2013.01); *F04D 29/36* (2013.01); *F04D 29/362* (2013.01); *Y02T 50/60* (2013.01)

(58) Field of Classification Search
CPC ....... B64C 11/38; B64C 11/385; B64C 11/40; B64C 11/42; F04D 29/325; F04D 29/36; F04D 29/362; F02K 3/06
See application file for complete search history.

(56) References Cited

U.S. PATENT DOCUMENTS 2,928,474 A 3/1960 Haworth et al.
3,130,677 A 4/1964 Liebhart
(Continued)

FOREIGN PATENT DOCUMENTS

CN 103702901 A 4/2014
CN 204452924 U 7/2015
(Continued)

*Primary Examiner* — Christopher R Legendre
(74) *Attorney, Agent, or Firm* — Dority & Manning, P.A.

(57) ABSTRACT

The variable pitch propeller assembly includes a hub. The variable pitch propeller assembly also includes a plurality of propeller blade assemblies spaced circumferentially about the hub. Each of the plurality of propeller blade assemblies configured to rotate a respective propeller blade. The variable pitch propeller assembly also includes a hydraulic fluid port assembly integrally formed and including at least three hydraulic fluid ports configured to receive respective flows of hydraulic fluid from a stationary hydraulic fluid transfer sleeve. The variable pitch propeller assembly also includes a pitch actuator assembly coupled in flow communication with at least three hydraulic fluid ports through respective hydraulic fluid transfer tubes. The pitch actuator coupled to the plurality of propeller blade assemblies to selectively control a pitch of the propeller blades. The pitch actuator assembly includes a travel stop configured to limit a rotation of at least one of the pitch actuator assemblies.

20 Claims, 12 Drawing Sheets

Related U.S. Application Data of application No. 15/043,036, filed on Feb. 12, 2016, now Pat. No. 10,393,137.

(51) Int. Cl.
  *F04D 29/32* (2006.01)
  *F04D 29/36* (2006.01)

(56) References Cited

U.S. PATENT DOCUMENTS

| | | |
|---|---|---|
| 3,212,586 A | 10/1965 | Barnes et al. |
| 3,922,852 A | 12/1975 | Drabek |
| 4,533,295 A | 8/1985 | Duchesneau |
| 4,863,347 A | 9/1989 | Trott et al. |
| 5,141,399 A | 8/1992 | Duchesneau et al. |
| 5,174,718 A | 12/1992 | Lampeter et al. |
| 6,077,040 A | 6/2000 | Pruden et al. |
| 8,133,027 B2 | 3/2012 | Carvalho et al. |
| 8,225,593 B2 | 7/2012 | Le Hong et al. |
| 8,985,277 B2 | 3/2015 | Hetherington et al. |
| 9,109,733 B2 | 8/2015 | Udall |
| 10,393,137 B2 | 8/2019 | Niergarth et al. |
| 11,221,017 B2 * | 1/2022 | Niergarth ............... B64C 11/38 |
| 2011/0002786 A1 | 1/2011 | Perkinson |
| 2014/0064930 A1 | 3/2014 | NguyenLoc et al. |
| 2015/0139802 A1 | 5/2015 | Curlier et al. |
| 2017/0254295 A1 | 9/2017 | Moster et al. |
| 2019/0009887 A1 | 1/2019 | Yvon et al. |
| 2022/0112902 A1 * | 4/2022 | Niergarth ............... B64C 11/38 |

FOREIGN PATENT DOCUMENTS

| | | |
|---|---|---|
| CN | 105074224 A | 11/2015 |
| EP | 0311276 A2 | 4/1989 |
| EP | 2500264 A2 | 9/2012 |
| WO | WO2015/052459 A1 | 4/2015 |

\* cited by examiner

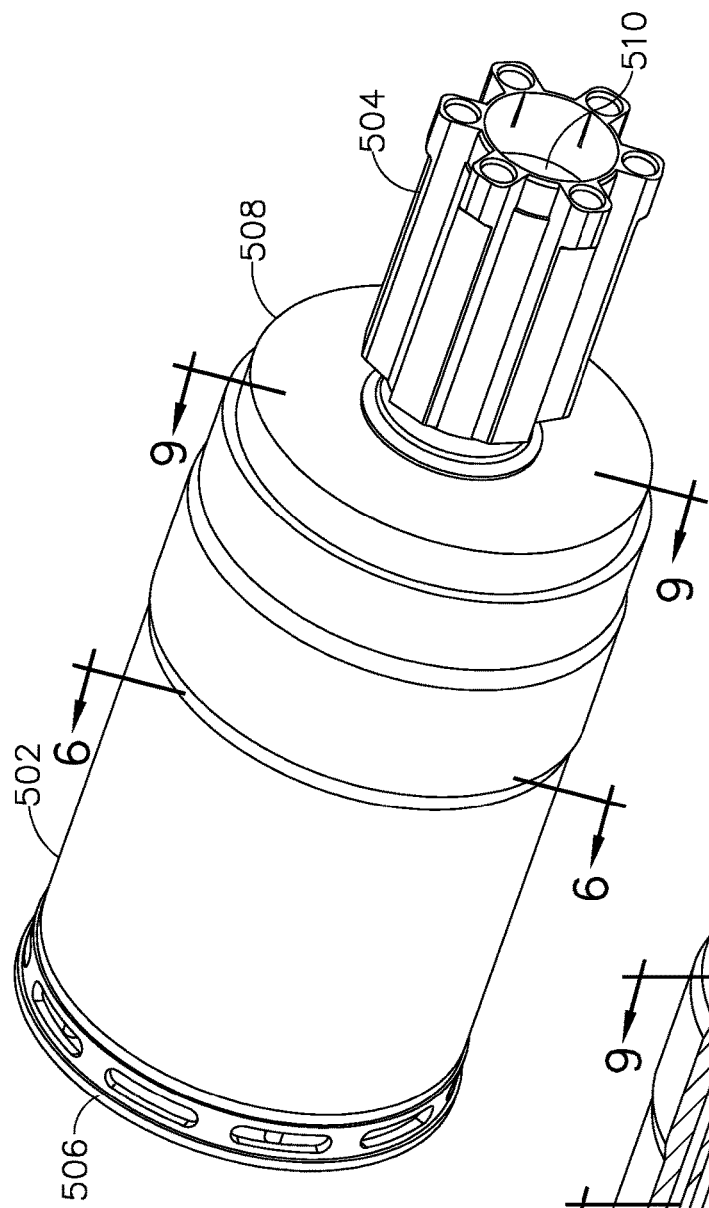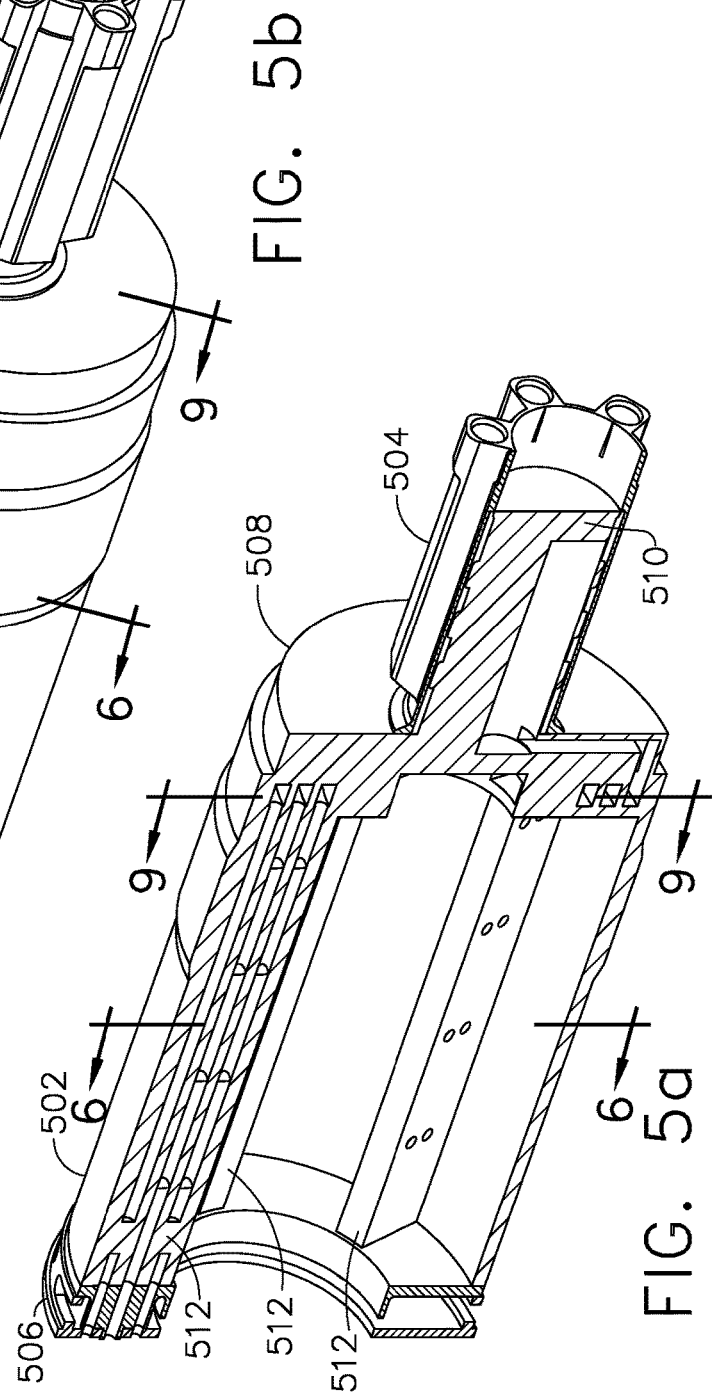
FIG. 5a
FIG. 5b

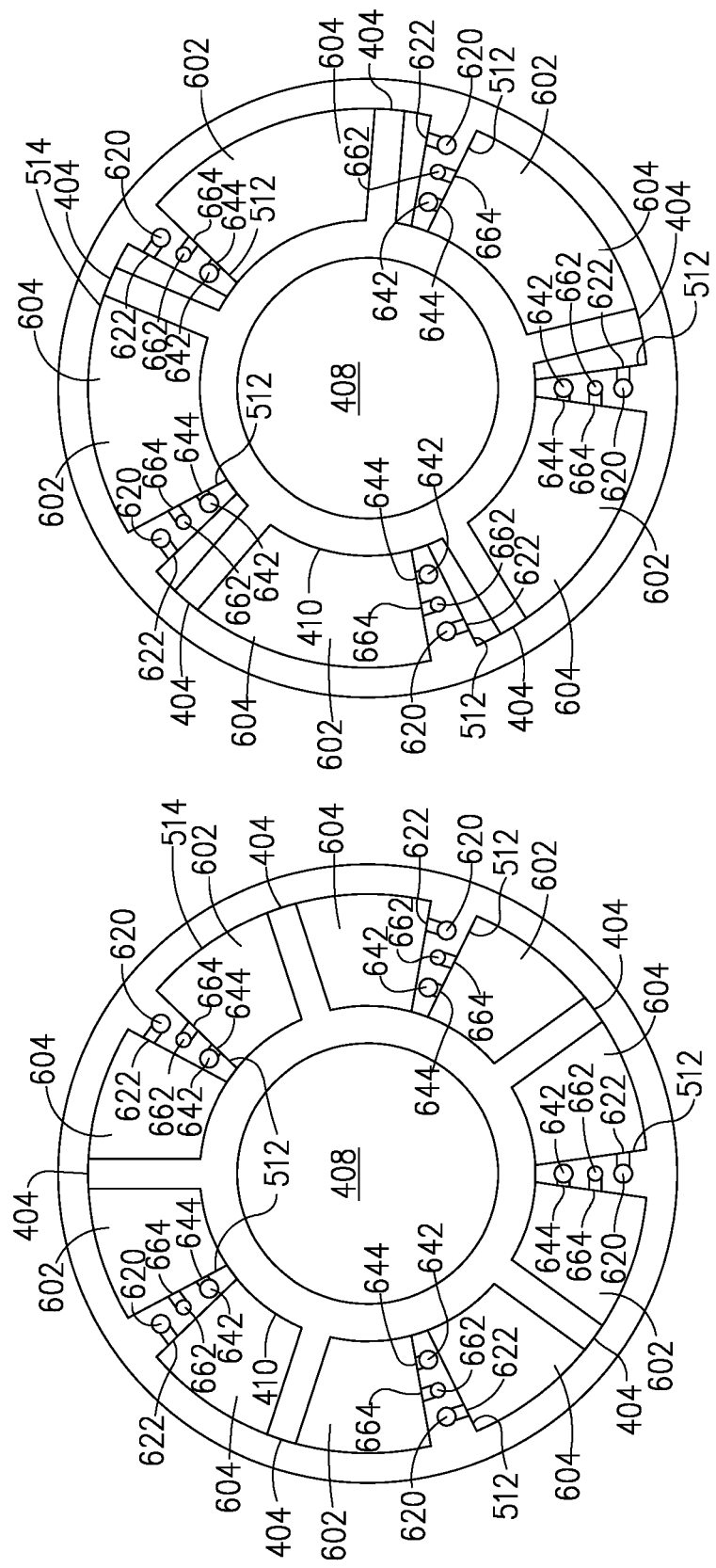

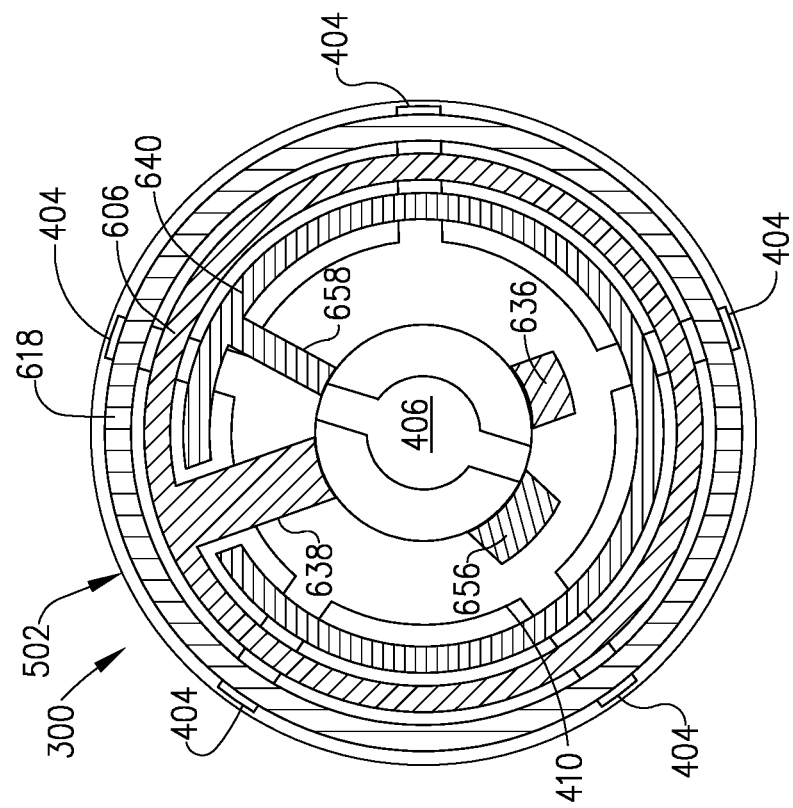
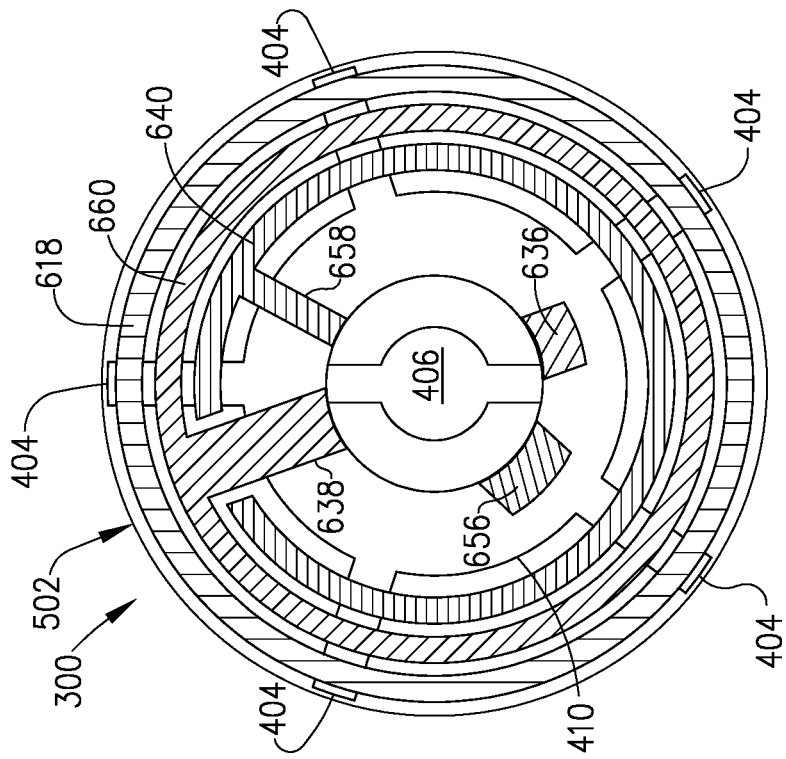

METHOD AND SYSTEM FOR INTEGRATED PITCH CONTROL MECHANISM ACTUATOR HYDRAULIC FLUID TRANSFER

CROSS-REFERENCE TO RELATED APPLICATIONS

This application is a continuation application of U.S. application Ser. No. 16/532,905 filed Aug. 6, 2019, which is a continuation application of U.S. application Ser. No. 15/043,036 filed Feb. 12, 2016, which is a non-provisional application, and wherein the above applications are hereby incorporated by reference in its entirety.

BACKGROUND

The field of the disclosure relates generally to gas turbine engines and, more particularly, to a method and system for supplying hydraulic fluid to an integrated pitch control mechanism (PCM) actuator.

Gas turbine engines typically include a fan assembly that provides air to a core engine and compresses the air to generate thrust. At least some known fan assemblies include variable pitch fan blades that are controlled by externally modulated flows of hydraulic fluid. Fan blade pitch controls the performance of the fan, so it may be optimized at various aircraft conditions. Fan pitch is typically controlled by hydraulic fluid transfer from a stationary supply system to a rotating actuator. At least some known gas turbine engines use an intermediate tubing mechanism to supply hydraulic fluid to the rotating actuator from the stationary supply system. Intermediate tubing mechanisms add weight to the aircraft and occupy valuable space on the engine.

BRIEF DESCRIPTION

In one aspect, a variable pitch propeller assembly is provided. The variable pitch propeller assembly includes a hub rotatable about a shaft having an axis of rotation. The variable pitch propeller assembly also includes a plurality of propeller blade assemblies spaced circumferentially about the hub. Each of the plurality of propeller blade assemblies configured to rotate a respective propeller blade about a radially extending pitch axis of rotation. The variable pitch propeller assembly also includes a hydraulic fluid port assembly integrally formed and rotatable with the shaft. The hydraulic fluid port assembly includes at least three hydraulic fluid ports configured to receive respective flows of hydraulic fluid from a stationary hydraulic fluid transfer sleeve at least partially surrounding the port assembly. The variable pitch propeller assembly also includes a pitch actuator assembly coupled in flow communication with at least three hydraulic fluid ports through respective hydraulic fluid transfer tubes extending axially from the hydraulic fluid port assembly to the pitch actuator. The pitch actuator coupled to the plurality of propeller blade assemblies to selectively control a pitch of the propeller blades. The pitch actuator assembly includes a travel stop configured to limit a rotation of at least one of the pitch actuator assemblies and the plurality of propeller blade assemblies.

In another aspect, a method of operating a variable pitch fan selectively controlled using an integrated pitch control mechanism (PCM) actuator assembly is provided. The PCM assembly includes a stationary to rotary fluid transfer assembly and a PCM actuator formed as an integral device. The method includes channeling a plurality of flows of hydraulic fluid between a source of modulated hydraulic fluid and a stationary transfer member of the stationary to rotary fluid transfer assembly. The method also includes directing the plurality of flows of hydraulic fluid across a gap between the stationary transfer member and a rotatable transfer member of the stationary to rotary fluid transfer assembly. The method also includes channeling the plurality of flows of hydraulic fluid to an actuation cavity of the PCM actuator. The method also includes selectively moving an actuation member of the PCM actuator based on relative pressures of the plurality of flows of hydraulic fluid.

In yet another aspect, a variable pitch turbofan gas turbine engine is provided. The variable pitch turbofan gas turbine engine includes a core engine including a multistage compressor and a fan assembly comprising an axis of rotation and powered by the core engine. The fan assembly includes a hub rotatable about a shaft having an axis of rotation. The fan assembly also includes a plurality of propeller blade assemblies spaced circumferentially about the hub. Each of the plurality of propeller blade assemblies configured to rotate a respective propeller blade about a radially extending pitch axis of rotation. The fan assembly also includes a hydraulic fluid port assembly integrally formed and rotatable with the shaft. The hydraulic fluid port assembly includes at least three hydraulic fluid ports configured to receive respective flows of hydraulic fluid from a stationary hydraulic fluid transfer sleeve at least partially surrounding the port assembly. The fan assembly also includes a pitch actuator assembly coupled in flow communication with the at least three hydraulic fluid ports through respective hydraulic fluid transfer tubes extending axially from the hydraulic fluid port assembly to the pitch actuator. The pitch actuator coupled to the plurality of propeller blade assemblies to selectively control a pitch of the propeller blades. The pitch actuator assembly includes a travel stop configured to limit a rotation of at least one of the pitch actuator assemblies and the plurality of propeller blade assemblies.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIGS. 1-12 show example embodiments of the method and apparatus described herein.

FIG. 1 is a schematic view of an exemplary gas turbine engine.

FIG. 2 is a side elevation view of a gas turbine engine fan rotor assembly including a PCM actuator assembly.

FIG. 3 is an exploded view of an integrated PCM actuator assembly.

FIG. 5a is a perspective view of an actuator shell, a hydraulic fluid transfer sleeve, and an end cap. FIG. 5b is a cutaway perspective view of an actuator shell, a hydraulic fluid transfer sleeve, and an end cap.

FIG. 6 is an axial view of the integrated PCM actuator assemblies shown in FIGS. 3, 4, 5, and 7 along lines 6-6 in FIGS. 4, 5, and 7. FIG. 6a is an axial view of the integrated PCM actuator assembly in a normal operational embodiment. FIG. 6b is an axial view of the integrated PCM actuator assembly in a decreased pitch operational embodiment.

FIG. 7 is a side elevation view of an integrated PCM actuator assembly.

FIG. 8 is an overlay of the internal flow passages of an actuator shell on a pitch actuator.

FIG. 9 is an axial view of the integrated PCM actuator assembly shown in FIGS. 3, 4, 5, and 7 along lines 9-9 in FIGS. 4, 5, and 7. FIG. 9a depicts a normal operational embodiment of integrated PCM actuator. FIG. 9b depicts a decreased pitch operational embodiment of integrated PCM actuator assembly.

FIG. 10 is a diagram of an increase flow path, a decrease flow path, and a drain flow path within integrated PCM actuator assembly with radial gap transfer.

FIG. 11 is a side elevation view of an integrated PCM actuator assembly with axial gap transfer.

FIG. 12 is a diagram of an increase flow path, a decrease flow path, and a drain flow path within integrated PCM actuator assembly with axial gap transfer.

Figure 1:
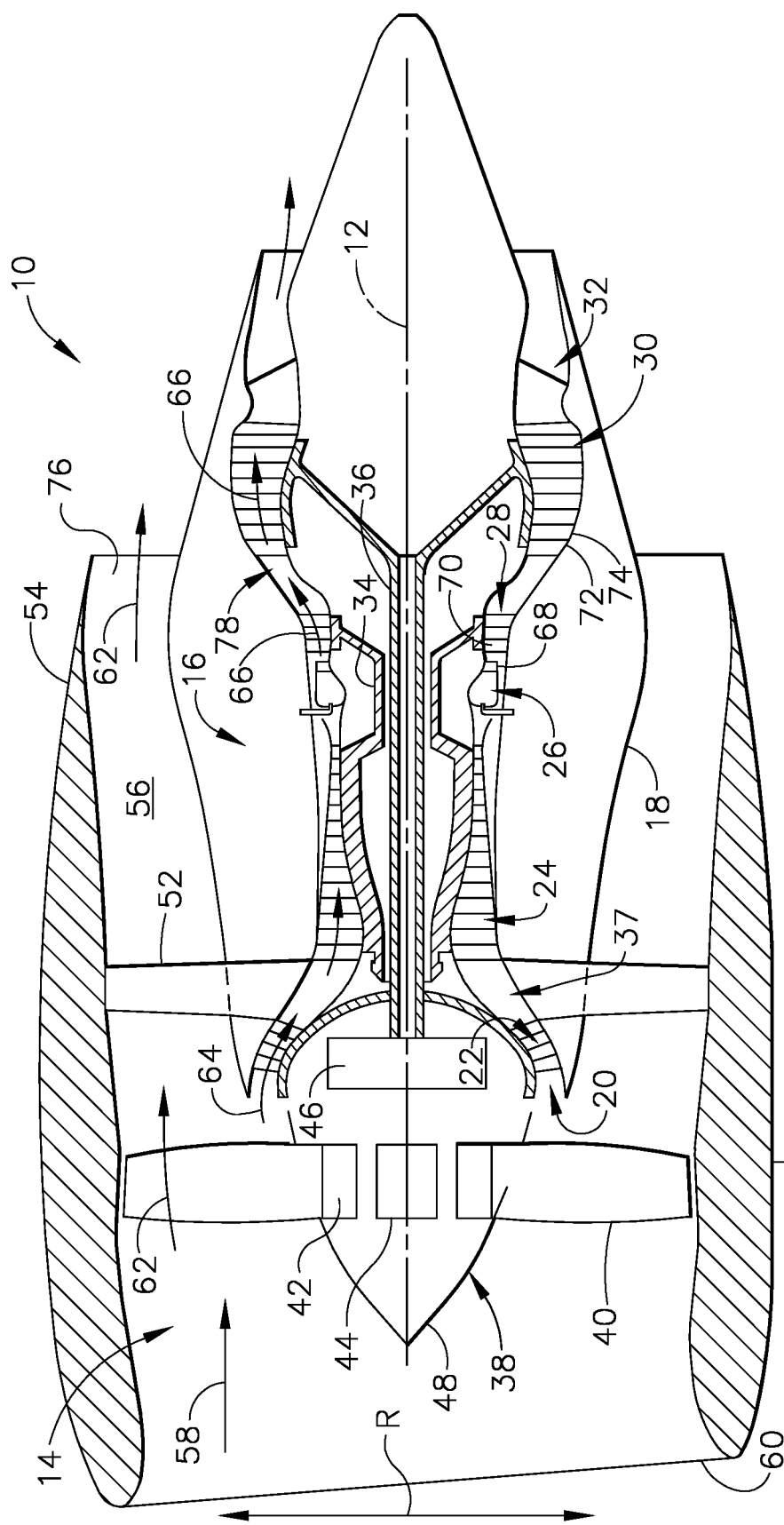

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The following detailed description illustrates embodiments of the disclosure by way of example and not by way of limitation. It is contemplated that the disclosure has general application to a method and system for supplying hydraulic fluid to an integrated PCM actuator assembly.

Embodiments of the integrated PCM actuator assembly hydraulic fluid supply system described herein provide hydraulic fluid to an integrated PCM actuator assembly of a gas turbine engine. The integrated PCM actuator assembly hydraulic fluid supply system includes a stationary hydraulic fluid transfer sleeve circumscribing a hydraulic fluid port assembly which includes a plurality of hydraulic fluid ports. A fan blade pitch change actuator assembly is coupled in flow communication with the hydraulic fluid port assembly. The stationary hydraulic fluid transfer sleeve is configured to deliver a flow of hydraulic fluid to the hydraulic fluid port assembly which actuates the pitch actuator assembly and controls the pitch of fan blades with the gas turbine engine.

The integrated PCM actuator assembly hydraulic fluid supply system described herein offers advantages over known methods of supplying hydraulic fluid to an integrated PCM actuator assembly. More specifically, the integrated PCM actuator assembly described herein supplies hydraulic fluid directly to the actuator. Supplying hydraulic fluid directly to the actuator in the integrated PCM actuator assembly decreases the weight of the actuator and the engine by eliminating additional mechanical parts. Furthermore, integrating the hydraulic fluid supply system into the actuator can improve reliability of the actuator.

FIG. 1 is a schematic cross-sectional view of a gas turbine engine in accordance with an exemplary embodiment of the present disclosure. In the example embodiment, the gas turbine engine is a high-bypass turbofan jet engine 10, referred to herein as "turbofan engine 10." As shown in FIG. 1, turbofan engine 10 defines an axial direction A (extending parallel to a longitudinal centerline 12 provided for reference) and a radial direction R. In general, turbofan engine 10 includes a fan section 14 and a core turbine engine 16 disposed downstream from fan section 14.

The exemplary core turbine engine 16 depicted generally includes a substantially tubular outer casing 18 that defines an annular inlet 20. Outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects HP turbine 28 to HP compressor 24. A low pressure (LP) shaft or spool 36 drivingly connects LP turbine 30 to LP compressor 22. The compressor section, combustion section 26, turbine section, and nozzle section 32 together define a core air flowpath 37.

For the embodiment depicted, fan section 14 includes a variable pitch fan 38 having a plurality of fan blades 40 coupled to a disk 42 in a spaced apart manner. As depicted, fan blades 40 extend outwardly from disk 42 generally along radial direction R. Each fan blade 40 is rotatable relative to disk 42 about a pitch axis P by virtue of fan blades 40 being operatively coupled to a suitable pitch change mechanism 44 configured to collectively vary the pitch of fan blades 40 in unison. Fan blades 40, disk 42, and pitch change mechanism 44 are together rotatable about longitudinal axis 12 by LP shaft 36 across a power gear box 46. Power gear box 46 includes a plurality of gears for adjusting the rotational speed of fan 38 relative to LP shaft 36 to a more efficient rotational fan speed.

Referring still to the exemplary embodiment of FIG. 1, disk 42 is covered by a rotatable front hub 48 aerodynamically contoured to promote an airflow through plurality of fan blades 40. Additionally, exemplary fan section 14 includes an annular fan casing or outer nacelle 50 that circumferentially surrounds fan 38 and/or at least a portion of core turbine engine 16. It should be appreciated that nacelle 50 may be configured to be supported relative to core turbine engine 16 by a plurality of circumferentially-spaced outlet guide vanes 52. Moreover, a downstream section 54 of nacelle 50 may extend over an outer portion of core turbine engine 16 so as to define a bypass airflow passage 56 therebetween.

During operation of turbofan engine 10, a volume of air 58 enters turbofan engine 10 through an associated inlet 60 of nacelle 50 and/or fan section 14. As volume of air 58 passes across fan blades 40, a first portion of air 58 as indicated by arrows 62 is directed or routed into bypass airflow passage 56 and a second portion of air 58 as indicated by arrow 64 is directed or routed into core air flowpath 37, or more specifically into LP compressor 22. The ratio between first portion of air 62 and second portion of air 64 is commonly known as a bypass ratio. The pressure of second portion of air 64 is then increased as it is routed through high pressure (HP) compressor 24 and into combustion section 26, where it is mixed with fuel and burned to provide combustion gases 66.

Combustion gases 66 are routed through HP turbine 28 where a portion of thermal and/or kinetic energy from combustion gases 66 is extracted via sequential stages of HP turbine stator vanes 68 that are coupled to outer casing 18 and HP turbine rotor blades 70 that are coupled to HP shaft or spool 34, thus causing HP shaft or spool 34 to rotate, thereby supporting operation of HP compressor 24. Combustion gases 66 are then routed through LP turbine 30 where a second portion of thermal and kinetic energy is extracted from combustion gases 66 via sequential stages of LP turbine stator vanes 72 that are coupled to outer casing 18 and LP turbine rotor blades 74 that are coupled to LP shaft or spool 36, thus causing LP shaft or spool 36 to rotate, thereby supporting operation of LP compressor 22 and/or rotation of fan 38.

Combustion gases 66 are subsequently routed through jet exhaust nozzle section 32 of core turbine engine 16 to provide propulsive thrust. Simultaneously, the pressure of first portion of air 62 is substantially increased as first portion of air 62 is routed through bypass airflow passage 56 before it is exhausted from a fan nozzle exhaust section 76 of turbofan engine 10, also providing propulsive thrust. HP turbine 28, LP turbine 30, and jet exhaust nozzle section 32 at least partially define a hot gas path 78 for routing combustion gases 66 through core turbine engine 16.

It should be appreciated, however, that exemplary turbofan engine 10 depicted in FIG. 1 is by way of example only, and that in other exemplary embodiments, turbofan engine 10 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboprop engine and unducted fan engine.

Figure 2:
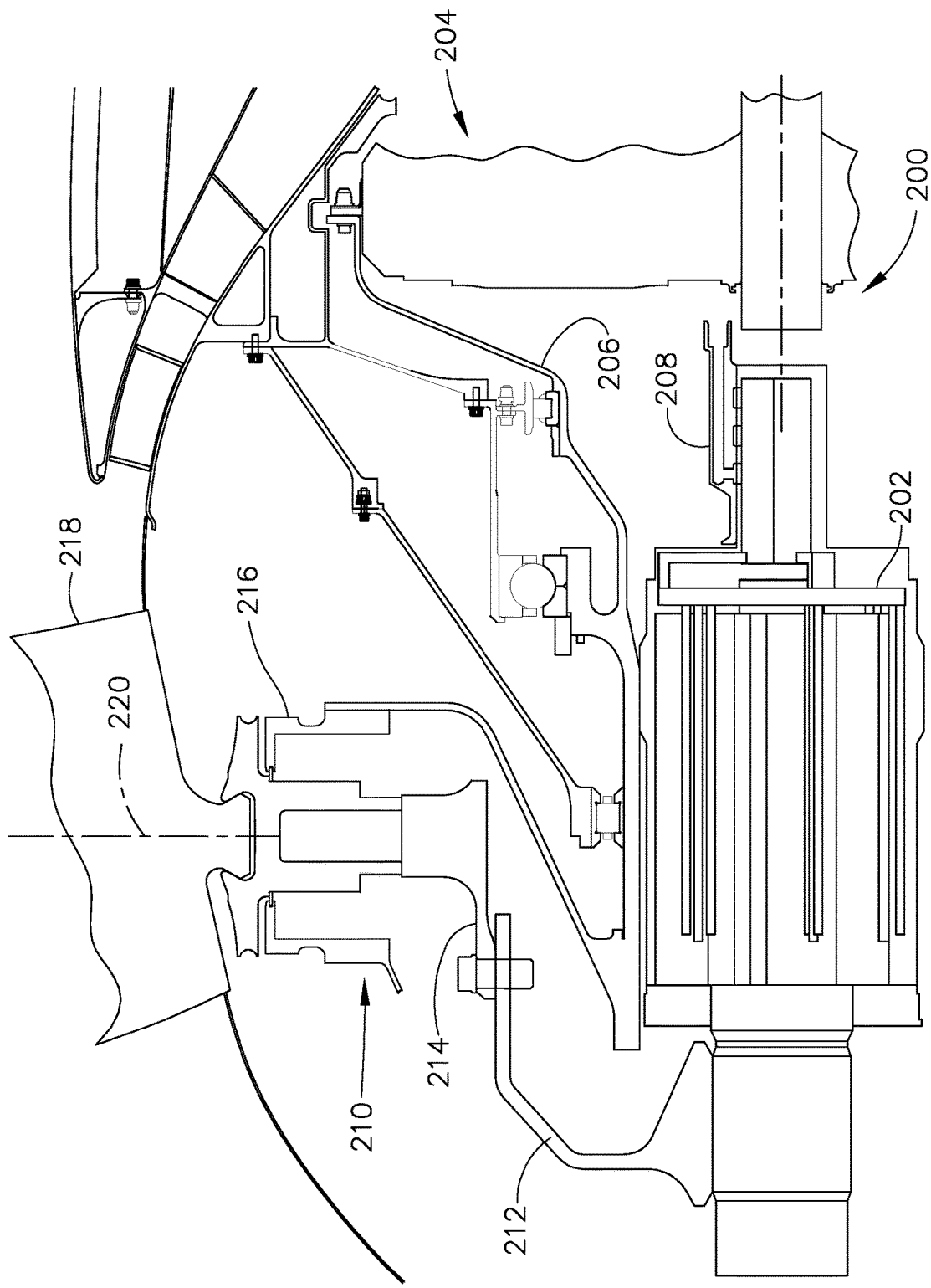

FIG. 2 is a side elevation view of a fan rotor assembly 200 including an integrated PCM actuator assembly 202 in accordance with an exemplary embodiment of the present disclosure. Fan rotor assembly 200 includes integrated PCM actuator assembly 202, an epicyclic gearbox 204, a power engine rotor 206, a stationary hydraulic fluid transfer sleeve 208, and a hub assembly 210. Hub assembly 210 includes a unison ring 212, a plurality of fan blade trunnion yokes 214, a plurality of trunnion assemblies 216, and a plurality of fan blades 218. In some embodiments, LP shaft 36 (shown in FIG. 1) is fixedly coupled to epicyclic gearbox 204 which is rotationally coupled to power engine rotor 206. Power engine rotor 206 is rotationally coupled to hub assembly 210 and integrated PCM actuator assembly 202 which is rotationally coupled to unison ring 212 through integrated PCM actuator assembly 202. Hub assembly 210 is rotationally coupled to fan blades 218. Unison rings 212 are rotationally coupled to fan blade trunnion yokes 214 which are rotationally coupled to trunnion assemblies 216. Trunnion assemblies 216 are rotationally coupled to fan blades 218. Stationary hydraulic fluid transfer sleeve 208 is coupled to supports (not shown) within epicyclic gearbox 204 and circumscribes integrated PCM actuator assembly 202. Stationary hydraulic fluid transfer sleeve 208 is coupled in flow communication with integrated PCM actuator assembly 202.

In operation, LP shaft 36 (shown in FIG. 1) is configured to rotate a plurality of gears (not shown) within epicyclic gearbox 204 which are configured to rotate power engine rotor 206. Power engine rotor 206 is configured to rotate integrated PCM actuator assembly 202 which is configured to rotate unison rings 212. Unison ring 212 is configured to rotate fan blade trunnion yokes 214 which are configured to rotate trunnion assemblies 216. Trunnion assemblies 216 are configured to rotate fan blades 218 about their respective axis. Stationary hydraulic fluid transfer sleeve 208 is configured to remain stationary while integrated PCM actuator assembly 202 is configured to rotate along with the fan module.

Stationary hydraulic fluid transfer sleeve 208 is coupled in flow communication with integrated PCM actuator assembly 202. Hydraulic fluid pressure from stationary hydraulic fluid transfer sleeve 208 actuates integrated PCM actuator assembly 202 which rotates unison ring 212 about a radially extending pitch axis of rotation 220. Unison ring 212 translates fan blade trunnion yokes 214 along an arcuate path, which rotate respective trunnion assemblies 216 about radially extending pitch axis of rotation 220. Trunnion assemblies 216 are configured to rotate fan blades 218 about radially extending pitch axis of rotation 220.

Figure 3:
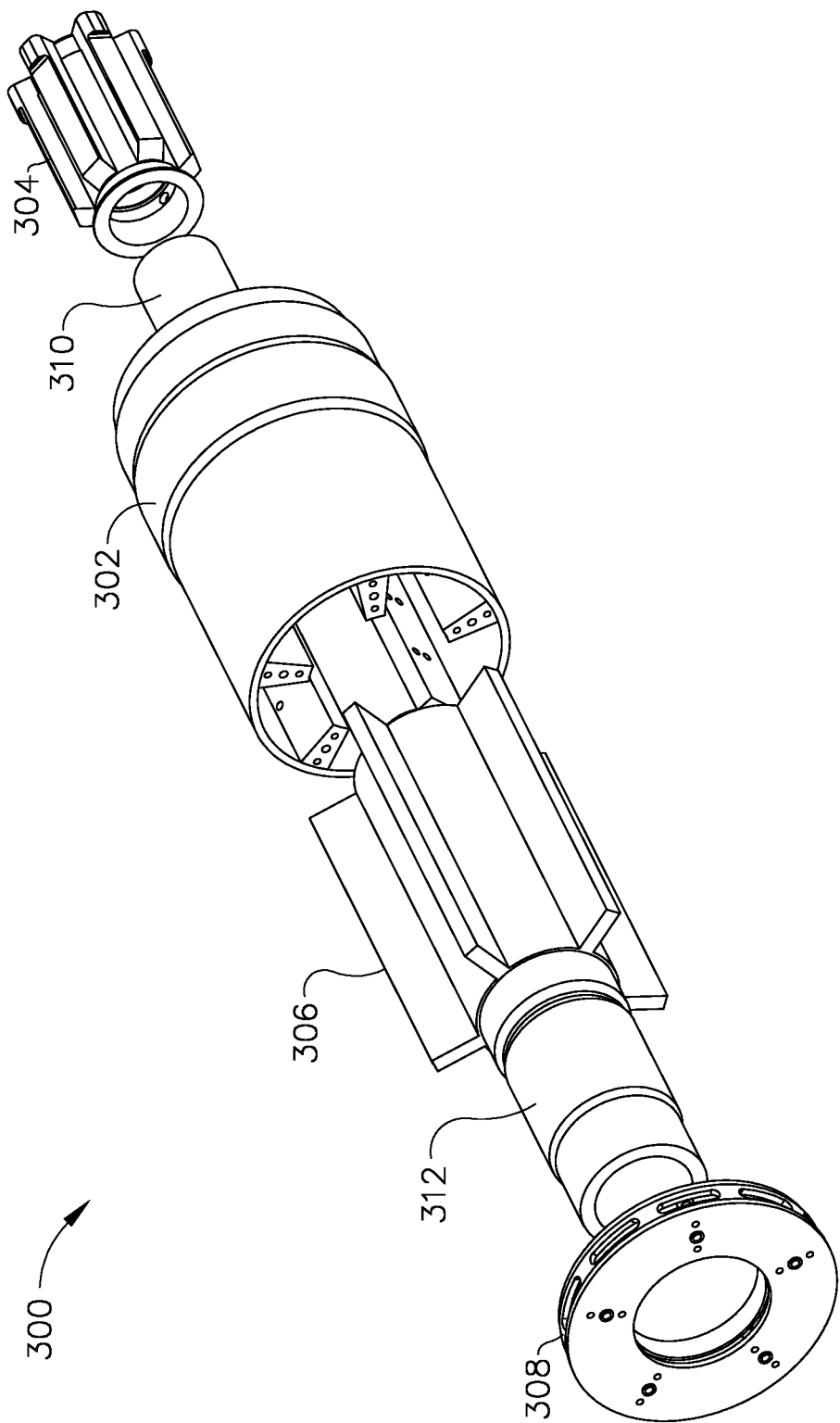

FIG. 3 is an exploded view of an integrated PCM actuator assembly 300 in accordance with an exemplary embodiment of the present disclosure. Integrated PCM actuator assembly 300 receives hydraulic fluid through a radial gap transfer. Integrated PCM actuator assembly 300 includes an actuator shell 302, a hydraulic fluid transfer sleeve 304, a pitch actuator 306, and an end cap 308. Actuator shell 302 includes a hydraulic fluid port assembly 310 extending aft in axial direction A from actuator shell 302. Hydraulic fluid transfer sleeve 304 circumscribes hydraulic fluid port assembly 310. Actuator shell 302 partially circumscribes pitch actuator 306 which includes a pitch actuator shaft 312 extending forward in axial direction A from pitch actuator 306 through end cap 308 to unison rings 212 (shown in FIG. 2). End cap 308 is coupled to the axially forward end of actuator shell 302.

Figures 4A, 4B:
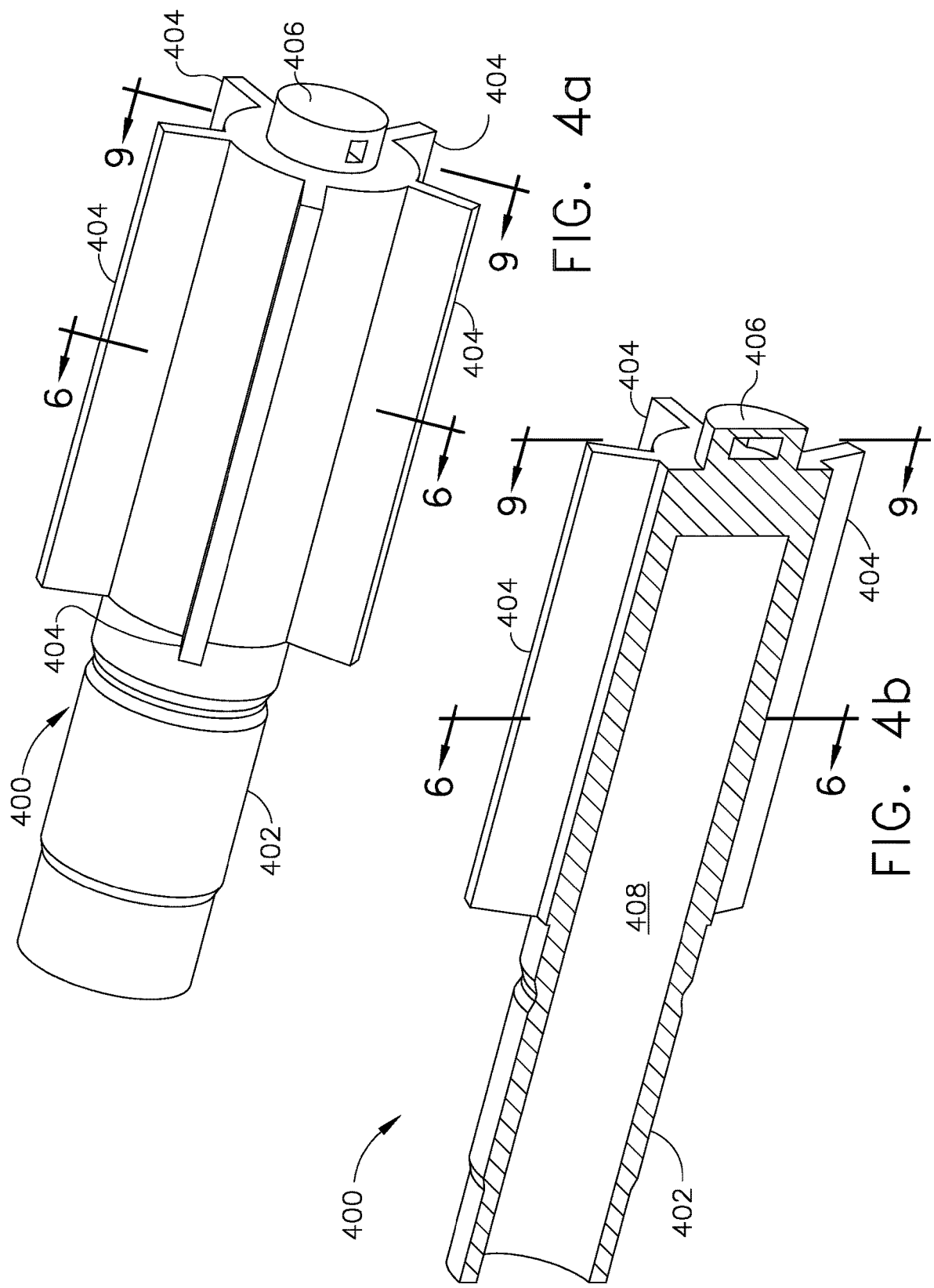
FIG. 4a is a perspective view of a pitch actuator.
FIG. 4b is a cutaway perspective view of a pitch actuator.

FIG. 4 is two perspective views of a pitch actuator 400. FIG. 4a is a perspective view of pitch actuator 400. FIG. 4b is a cutaway perspective view of pitch actuator 400. Pitch actuator 400 includes a plurality of pitch actuator vanes 404 extending radially outward from pitch actuator shaft 402 and a mechanical transfer range limiter 406 extending aft in axial direction A from pitch actuator 400. Pitch actuator 400 also includes a pitch actuator void 408 extending through pitch actuator shaft 402.

FIG. 5 is two perspective views of an actuator shell 502, a hydraulic fluid transfer sleeve 504, and an end cap 506. FIG. 5a is a perspective view of actuator shell 502, hydraulic fluid transfer sleeve 504, and end cap 506. FIG. 5b is a cutaway perspective view of actuator shell 502, hydraulic fluid transfer sleeve 504, and end cap 506. Actuator shell 502 includes an actuator cap 508 coupled to the axially aft end of actuator shell 502. Hydraulic fluid port assembly 510 extends aft in axial direction A from actuator cap 508 and is circumscribed by hydraulic fluid transfer sleeve 504. Actuator shell 502 also includes a plurality of actuator shell vanes 512 extending radially inward from actuator shell 502.

Figure 7:
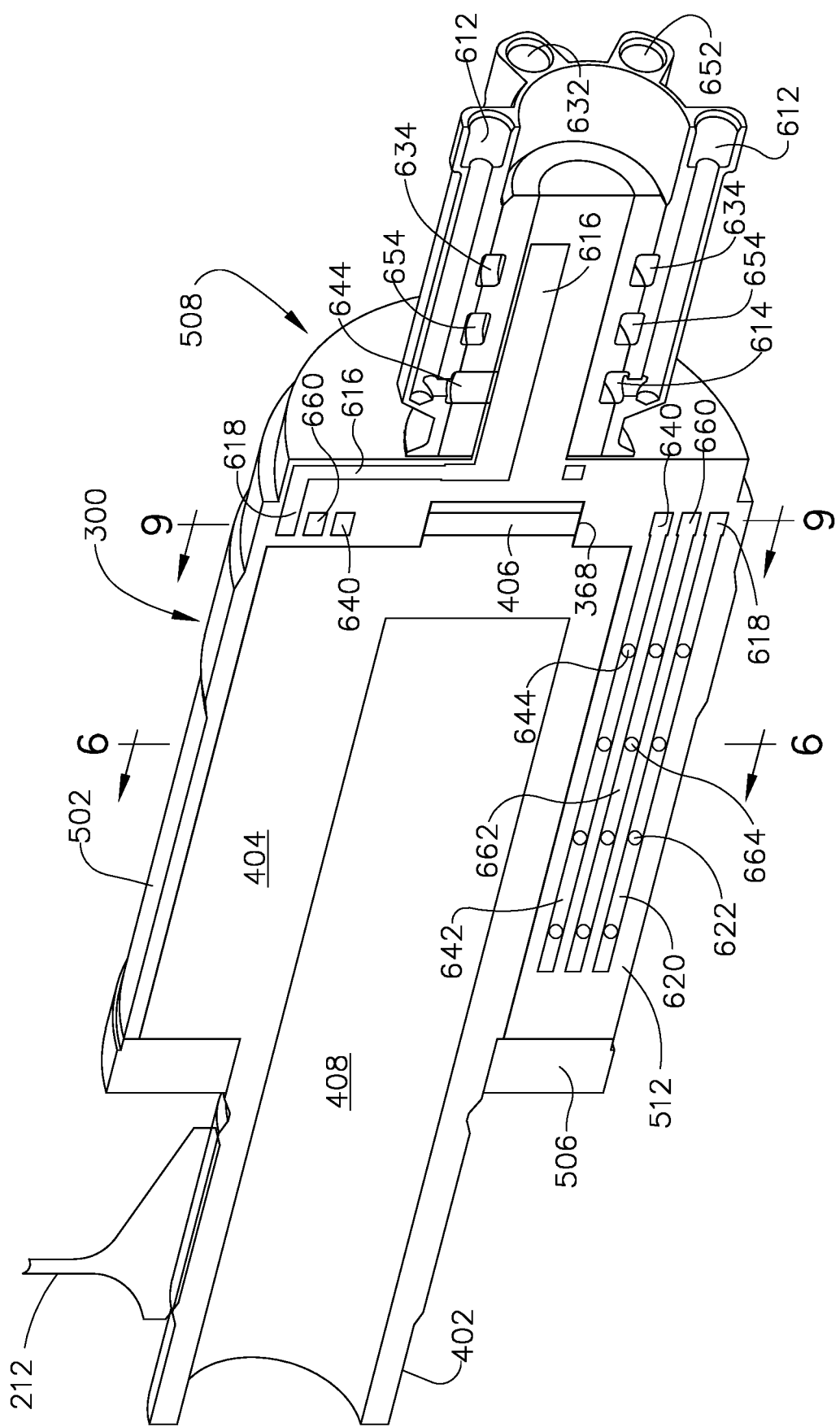

FIG. 6 is an axial view of the integrated PCM actuator assembly 300 shown in FIGS. 3, 4, 5, and 7 along lines 6-6 in FIGS. 4, 5, and 7. FIG. 6a is an axial view of the integrated PCM actuator assembly 300 in a non-mechanically limited position. FIG. 6b is an axial view of the integrated PCM actuator 300 in a mechanically limited position. FIG. 6 introduces the structure of integrated PCM actuator assembly 300 with pitch actuator 400 disposed within actuator shell 502. FIG. 6 will also be discussed with the operational embodiments of integrated PCM actuator assembly 300.

Pitch actuator vanes 404 extend radially outward from pitch actuator 400 to an inner radial surface 514 of actuator shell 502. Actuator shell vanes 512 extend radially inward from actuator shell 502 to an outer radial surface 410 of pitch actuator 400. Each actuator shell vane 512 extends between two pitch actuator vanes 404 forming an alternating circumferential pattern of actuator shell vanes 512 and pitch actuator vanes 404. A decrease cavity 602 and an increase cavity 604 are formed from the volume between actuator shell vanes 512 and pitch actuator vanes 404. Each actuator shell vane 512 is adjacent to decrease cavity 602 on one side and increase cavity 604 on the other side.

Figure 8:
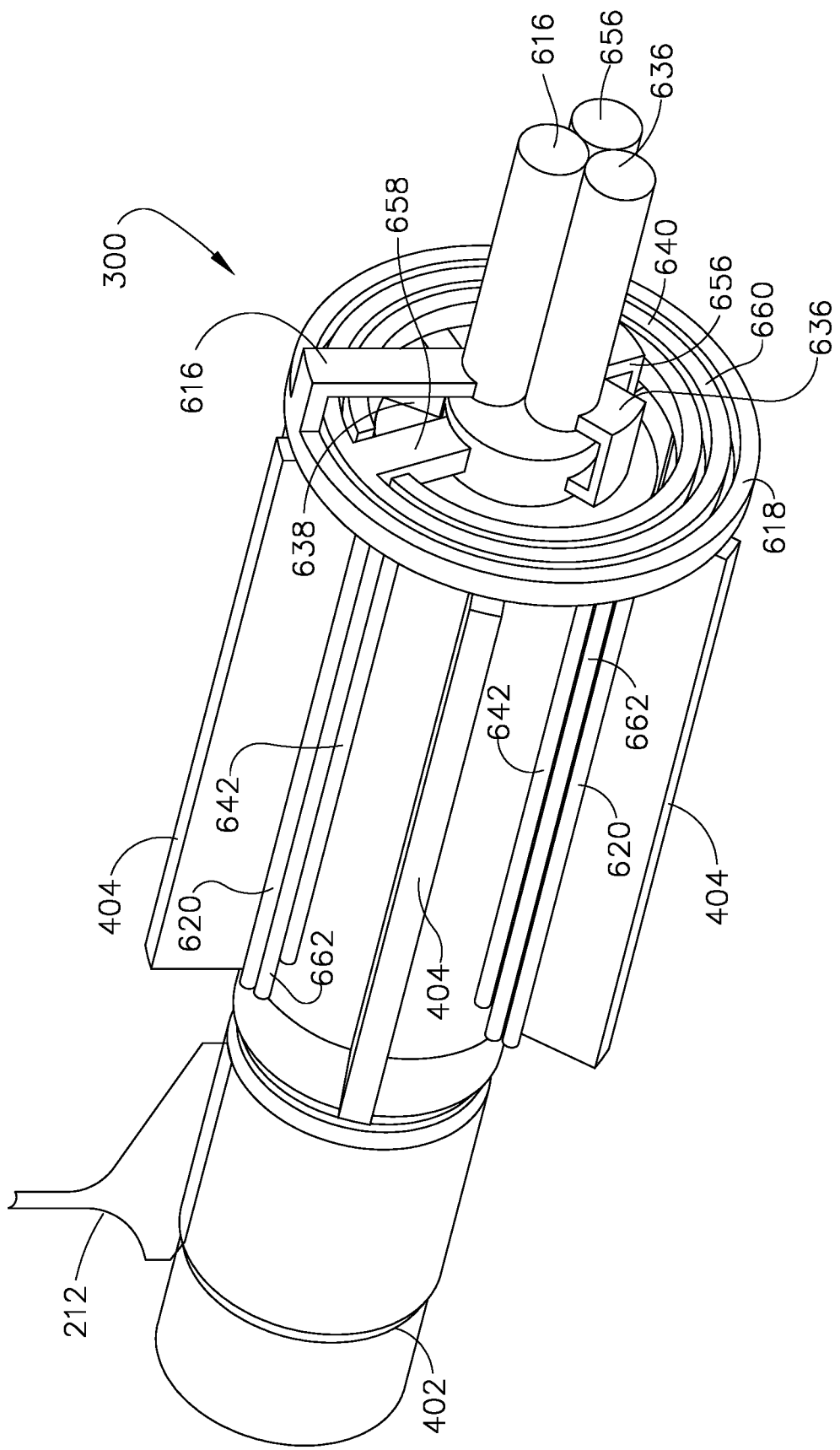
Figure 10:
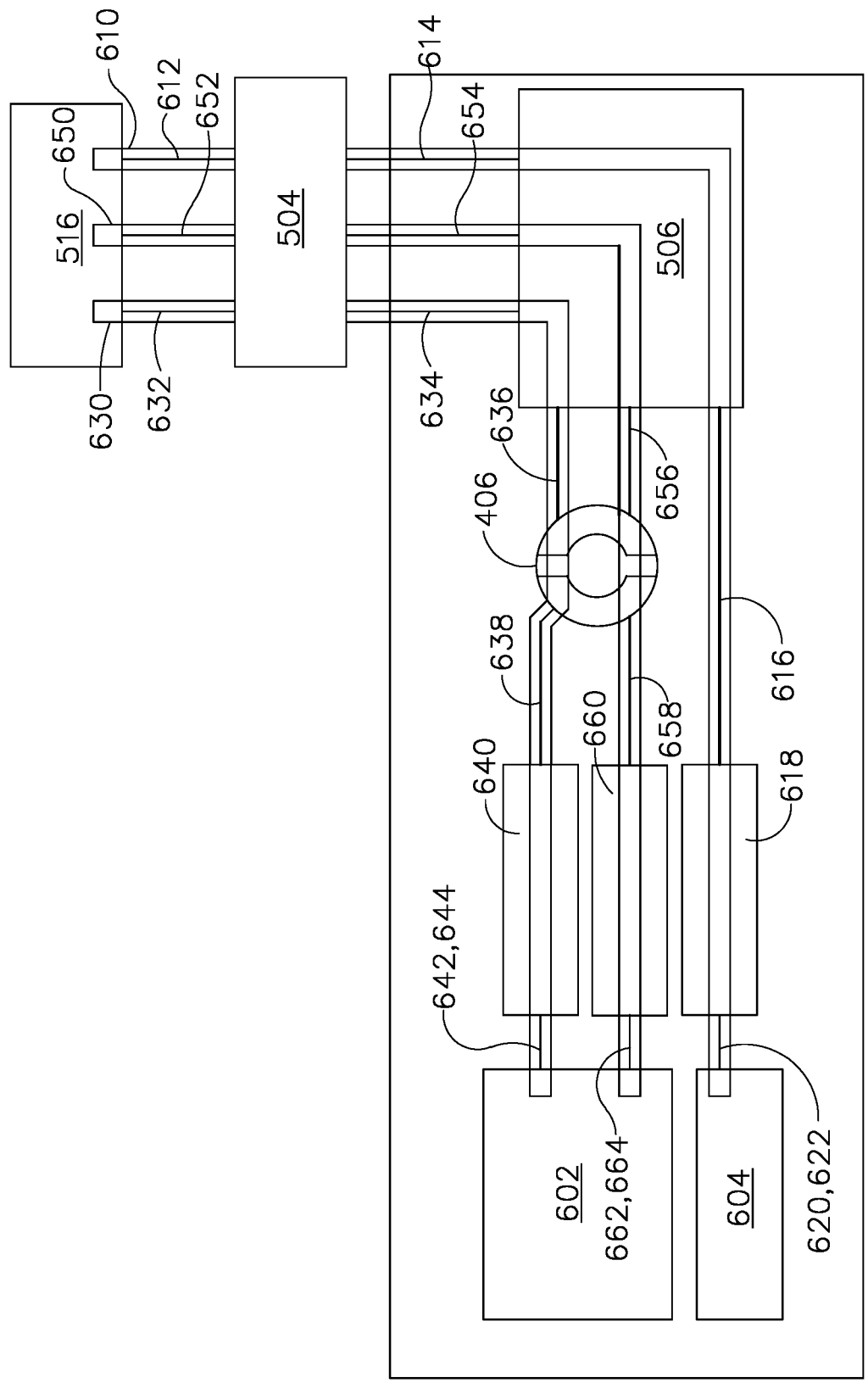

FIG. 7 is a side elevation view of an integrated PCM actuator assembly 300 in accordance with an exemplary embodiment of the present disclosure. FIG. 8 is an overlay of the internal flow passages of actuator shell 502 on pitch actuator 400. FIG. 9 is an axial view of the integrated PCM actuator assembly shown in FIGS. 3, 4, 5, and 8 along lines 10-10 in FIGS. 4, 5, and 8. FIG. 9a depicts a normal operational embodiment of integrated PCM actuator assembly 300. FIG. 9b depicts a decreased pitch operational embodiment of integrated PCM actuator assembly 300. FIG. 10 is a diagram of an increase flow path 610, a decrease flow path 630, and a drain flow path 650 within integrated PCM actuator assembly 300. Increase flow path 610, decrease flow path 630, and drain flow path 650 are described below with reference to FIGS. 7-10. The internal flow passages are shown with increased clarity in FIG. 8 with removal of the outer casing. The ports that feed the internal passages are best depicted in FIG. 6, which has previously been discussed. FIG. 9 demonstrates that the supply lines are oriented to create fail safes. Finally, FIG. 10 presents a high level schematic of increase flow path 610, decrease flow path 630, and drain flow path 650. A hydraulic fluid supply system 516 supplies hydraulic fluid to all flow paths.

Increase flow path 610 includes a stationary increase delivery tube 612 coupled in flow communication with hydraulic fluid supply system 516 and hydraulic fluid transfer sleeve 504. A rotating increase delivery channel 614 is disposed within hydraulic fluid port assembly 510 and receives hydraulic fluid from stationary increase delivery tube 612. Rotating increase delivery channel 614 directs hydraulic fluid to an increase actuator passage 616 disposed within hydraulic fluid port assembly 510 and actuator cap 508. Increase actuator passage 616 is coupled in flow communication with an increase actuator cap delivery channel 618. Increase actuator cap delivery channel 618 channels hydraulic fluid circumferentially around actuator cap 508 and is coupled in flow communication with a plurality of increase actuator vane passages 620 which extend forward in axial direction A through actuator vanes 512. Increase actuator vane passages 620 channels hydraulic fluid to a plurality of increase delivery tubes 622 which deliver hydraulic fluid to increase cavities 604. Hydraulic fluid delivered to increase cavities 604 increases the hydraulic fluid pressure in increase cavities 604. Increased hydraulic fluid pressure in increase cavities 604 increases the hydraulic fluid pressure on one side of pitch actuator vanes 404 which rotates pitch actuator 400 and rotate unison ring 212.

Decrease flow path 630 includes a stationary decrease delivery tube 632 coupled in flow communication with hydraulic fluid supply system 516 and hydraulic fluid transfer sleeve 504. A rotating decrease delivery channel 634 is disposed within hydraulic fluid port assembly 510 and receives hydraulic fluid from stationary decrease delivery tube 632. Rotating decrease delivery channel 634 directs hydraulic fluid to a decrease actuator passage 636 disposed within hydraulic fluid port assembly 510 and actuator cap 508. Decrease actuator passage 636 is coupled in flow communication with mechanical transfer range limiter 406. Mechanical transfer range limiter 406 channels hydraulic fluid to a decrease range limiter channel 638 which channels hydraulic fluid to a decrease actuator cap delivery channel 640. Decrease actuator cap delivery channel 640 channels hydraulic fluid circumferentially around actuator cap 508 and is coupled in flow communication with a plurality of decrease actuator vane passages 642 which extend forward in axial direction A through actuator vanes 512. Decrease actuator vane passages 642 channels hydraulic fluid to a plurality of decrease delivery tubes 644 which deliver hydraulic fluid to decrease cavities 602.

The flow of hydraulic fluid in drain flow path 650 is bidirectional. Drain flow path 650 can deliver hydraulic fluid to decrease cavities 602 from hydraulic fluid supply system 516 or can deliver hydraulic fluid to hydraulic fluid supply system 516 from decrease cavities 602. During normal operations drain flow path 650 is not pressurized with hydraulic fluid. Drain flow path 650 includes a stationary drain delivery tube 652 coupled in flow communication with hydraulic fluid supply system 516 and hydraulic fluid transfer sleeve 504. A rotating drain delivery channel 654 is disposed within hydraulic fluid port assembly 510 and receives hydraulic fluid from stationary drain delivery tube 652. Rotating drain delivery channel 654 directs hydraulic fluid to a decrease actuator passage 656 disposed within hydraulic fluid port assembly 510 and actuator cap 508. Drain actuator passage 656 is coupled in flow communication with mechanical transfer range limiter 406. Mechanical transfer range limiter 406 channels hydraulic fluid to a drain range limiter channel 658 which channels hydraulic fluid to a drain actuator cap delivery channel 660. Drain actuator cap delivery channel 660 channels hydraulic fluid circumferentially around actuator cap 508 and is coupled in flow communication with a plurality of drain actuator vane passages 662 which extend forward in axial direction A through actuator vanes 512. Drain actuator vane passages 662 channels hydraulic fluid to a plurality of drain delivery tubes 664 which deliver hydraulic fluid to decrease cavities 602.

FIG. 6a depicts a normal operational embodiment of integrated PCM actuator assembly 300. The hydraulic fluid pressure on both sides of pitch actuator vanes 404 are equal and the volumes of increase cavity 604 and decrease cavity 602 are also equal. Pitch actuator 400 is not rotated and unison rings 212 are not rotated. FIG. 6b depicts a decreased pitch operational embodiment of integrated PCM actuator assembly 300. The hydraulic fluid pressure in decrease cavity 602 is increased by the introduction of hydraulic fluid to decrease flow path 630. Increased hydraulic fluid pressure in decrease cavities 602 increases the hydraulic fluid pressure on one side of pitch actuator vanes 404 which rotates pitch actuator 400 and rotate unison ring 212.

FIG. 9a depicts a normal operational embodiment of integrated PCM actuator assembly 300. Mechanical transfer range limiter 406 is in flow communication with decrease actuator passage 636 and decrease range limiter channel 638. Hydraulic fluid is channeled through decrease flow passage 630 as previously discussed. As pitch actuator 400 rotates further from normal operating position, mechanical transfer range limiter 406 rotates away from flow communication from decrease actuator passage 636 and into flow communication with drain actuator passage 656. FIG. 9b depicts a decreased pitch operational embodiment of integrated PCM actuator assembly 300. During normal operations, drain flow path 650 is not pressurized. When mechanical transfer range limiter 406 rotates into flow communication with drain actuator passage 656 and drain range limiter channel 658, pressurized hydraulic fluid drains from decrease cavity 602 into drain flow path 650 as previously discussed. Hydraulic fluid drains from decrease cavity 602 to hydraulic fluid supply system 516. Draining hydraulic fluid from decrease cavity 602 decreases the hydraulic fluid pressure in decrease cavity 602 which halts the rotation of pitch actuator 400 in the decrease direction. As pitch actuator 400 rotates further in the opposite direction, mechanical transfer range limiter 406 rotates away from flow communication from drain actuator passage 656 and into flow communication with decrease actuator passage 636, allowing once again for rotation in both directions.

Figure 11:
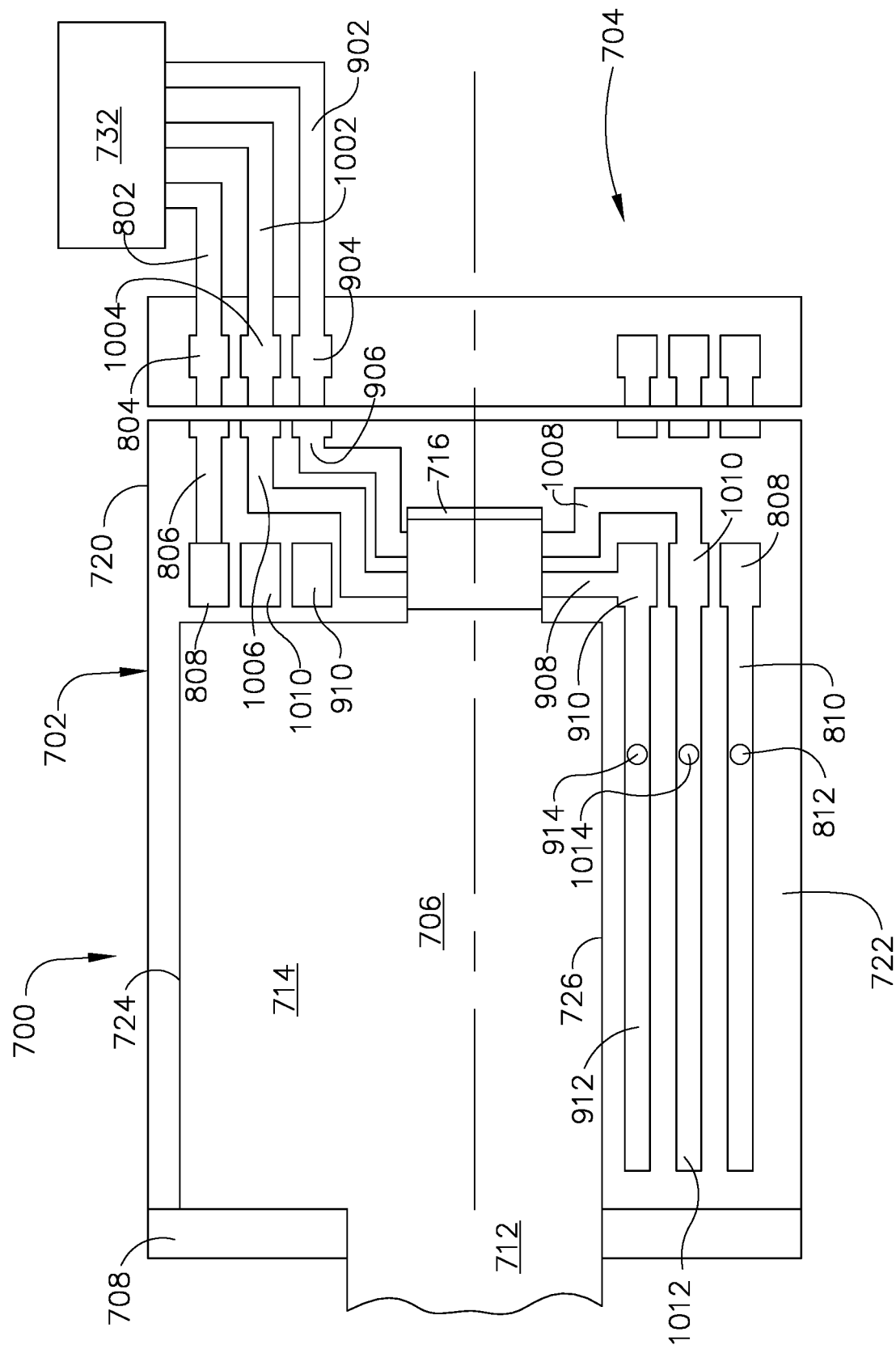

FIG. 11 is a side elevation view of an integrated PCM actuator assembly 700 in accordance with an exemplary embodiment of the radial gap transfer of the present disclosure. Integrated PCM actuator assemblies 300 and 700 are the same item except integrated PCM actuator assembly 300 receives hydraulic fluid through an axial gap transfer while integrated PCM actuator assembly 700 receives hydraulic fluid through a radial gap transfer. For clarity, the structural components of integrated PCM actuator assembly 700 are labeled with 700 series numbers while fluid channels and passages within integrated PCM actuator assembly 700 are labeled with 800, 900, and 1000 series numbers (shown with more clarity in FIG. 12). Integrated PCM actuator assembly 700 includes an actuator shell 702, a hydraulic fluid transfer assembly 704, a pitch actuator 706, and an end cap 708. Hydraulic fluid transfer assembly 704 extends aft in axial direction A from actuator shell 702. Actuator shell 702 partially circumscribes pitch actuator 706 which includes a pitch actuator shaft 712 extending forward in axial direction A from pitch actuator 706 through end cap 708 to unison rings 212 (shown in FIG. 2). End cap 708 is coupled to the axially forward end of actuator shell 702.

Pitch actuator 706 includes a plurality of pitch actuator vanes 714 extending radially outward from pitch actuator shaft 712 and a mechanical transfer range limiter 716 extending aft in axial direction A from pitch actuator 706. Actuator shell 702 includes an actuator cap 720 coupled to the axially aft end of actuator shell 702. Actuator shell also includes a plurality of actuator shell vanes 722 extending radially inward from actuator shell 702. Pitch actuator vanes 714 extend radially outward from pitch actuator 706 to an inner radial surface 724 of actuator shell 706. Actuator shell vanes 722 extend radially inward from actuator shell 706 to an outer radial surface 726 of pitch actuator 706. Each actuator shell vane 722 extends between two pitch actuator vanes 714 forming an alternating circumferential pattern of actuator shell vanes 722 and pitch actuator vanes 714. A decrease cavity (not shown) and an increase cavity (not shown) are formed from the volume between actuator shell vanes 722 and pitch actuator vanes 714. Each actuator shell vane 722 is adjacent to decrease cavity on one side and increase cavity on the other side.

Figure 12:
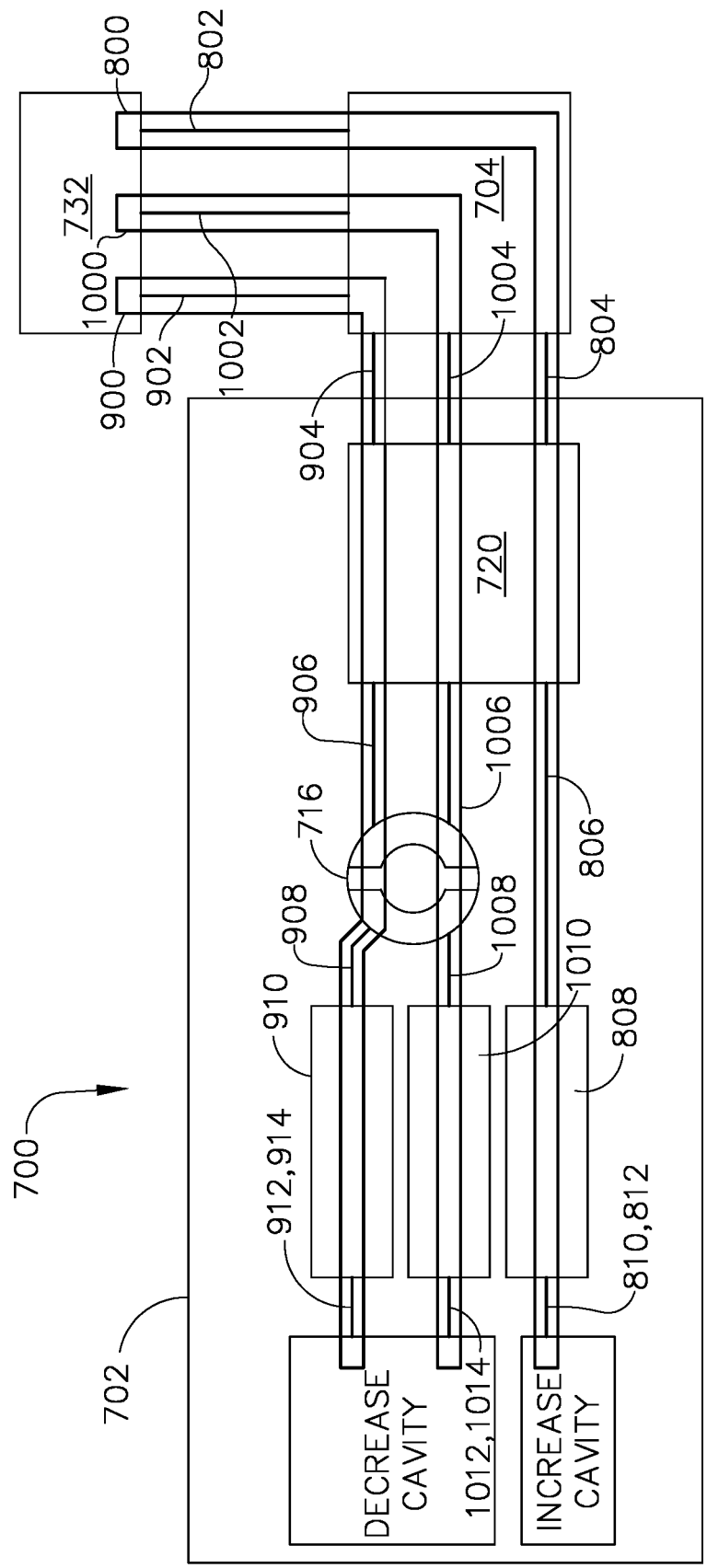

FIG. 12 is a diagram of an increase flow path 800, a decrease flow path 900, and a drain flow path 1000 within integrated PCM actuator assembly 700. A hydraulic fluid supply system 732 supplies hydraulic fluid to all flow paths. Increase flow path 800 includes a stationary increase delivery tube 802 coupled in flow communication with hydraulic fluid supply system 732 and hydraulic fluid transfer assembly 704. Stationary increase delivery tube 802 delivers hydraulic fluid to a hydraulic fluid transfer assembly increase passage 804 disposed within hydraulic fluid transfer assembly 704. A rotating increase delivery channel 806 is disposed within actuator cap 720 and receives hydraulic fluid from hydraulic fluid transfer assembly passage 804. Rotating increase delivery channel 806 directs hydraulic fluid to an increase actuator cap delivery channel 808. Increase actuator cap delivery channel 808 channels hydraulic fluid circumferentially around actuator cap 720 and is coupled in flow communication with a plurality of increase actuator vane passages 810 which extend forward in axial direction A through actuator vanes 722. Increase actuator vane passages 810 channels hydraulic fluid to a plurality of increase delivery tubes 812 which deliver hydraulic fluid to increase cavities.

Hydraulic fluid delivered to increase cavities increases the hydraulic fluid pressure in increase cavities (refer to FIGS. 6 and 9 as this region of integrated PCM actuator assembly 700 is the same as integrated PCM actuator assembly 300). Increased hydraulic fluid pressure in increase cavities increases the hydraulic fluid pressure on one side of pitch actuator vanes 714 which rotates pitch actuator 706 and rotate unison ring 212 (shown in FIG. 2).

Decrease flow path 900 includes a stationary decrease delivery tube 902 coupled in flow communication with hydraulic fluid supply system 732 and hydraulic fluid transfer assembly 704. Stationary decrease delivery tube 902 delivers hydraulic fluid to a hydraulic fluid transfer assembly decrease passage 904 disposed within hydraulic fluid transfer assembly 704. A rotating decrease delivery channel 906 is disposed within actuator cap 720 and receives hydraulic fluid from hydraulic fluid transfer assembly decrease passage 904. Rotating decrease delivery channel 906 directs hydraulic fluid to mechanical transfer range limiter 716 which directs hydraulic fluid to a decrease range limiter channel 908. Decrease range limiter channel 908 channels hydraulic fluid to decrease actuator cap delivery channel 910 which channels hydraulic fluid circumferentially around actuator cap 720 and is coupled in flow communication with a plurality of decrease actuator vane passages 912 which extend forward in axial direction A through actuator vanes 722. Decrease actuator vane passages 912 channels hydraulic fluid to a plurality of decrease delivery tubes 914 which deliver hydraulic fluid to decrease cavities.

The flow of hydraulic fluid in drain flow path 1000 is bidirectional. Drain flow path 1000 can deliver hydraulic fluid to decrease cavities from hydraulic fluid supply system 516 or can deliver hydraulic fluid to hydraulic fluid supply system 516 from decrease cavities. During normal operations drain flow path 1000 is not pressurized with hydraulic fluid. Drain flow path 1000 includes a stationary drain delivery tube 1002 coupled in flow communication with hydraulic fluid supply system 732 and hydraulic fluid transfer assembly 704. Stationary drain delivery tube 1002 delivers hydraulic fluid to a hydraulic fluid transfer assembly drain passage 1004 disposed within hydraulic fluid transfer assembly 704. A rotating drain delivery channel 1006 is disposed within actuator cap 720 and receives hydraulic fluid from hydraulic fluid transfer assembly drain passage 1004. Rotating drain delivery channel 1006 directs hydraulic fluid to mechanical transfer range limiter 716 which directs hydraulic fluid to a drain range limiter channel 1008. Drain range limiter channel 1008 channels hydraulic fluid to drain actuator cap delivery channel 1010 which channels hydraulic fluid circumferentially around actuator cap 720 and is coupled in flow communication with a plurality of drain actuator vane passages 1012 which extend forward in axial direction A through actuator vanes 722. Drain actuator vane passages 1012 channels hydraulic fluid to a plurality of drain delivery tubes 1014 which deliver hydraulic fluid to decrease cavities.

During normal operations, the hydraulic fluid pressure on both sides of pitch actuator vanes 714 are equal and the volumes of increase cavity and decrease cavity are also equal. Pitch actuator 706 is not rotated and unison rings 212 are not rotated. During decreased pitch operations, the hydraulic fluid pressure in decrease cavity is increased by the introduction of hydraulic fluid to decrease flow path 900. Increased hydraulic fluid pressure in decrease cavities increases the hydraulic fluid pressure on one side of pitch actuator vanes 714 which rotates pitch actuator 706 and rotate unison ring 212. Mechanical transfer range limiter 716 operates in the same manner as mechanical transfer limiter 316 and prevents pitch actuator 706 from rotating too far.

The above-described hydraulic fluid supply systems provide an efficient method for supplying hydraulic fluid to an integrated PCM actuator assembly. Specifically, the above-described hydraulic fluid supply system delivers hydraulic fluid directly to the actuator. When hydraulic fluid is delivered directly to the actuator, less equipment is needed to deliver hydraulic fluid. As such, providing hydraulic fluid directly to the actuator improves the reliability of the integrated PCM actuator assembly. Additionally, integrating the hydraulic fluid supply system within the integrated PCM actuator assembly reduces the weight of the engine.

Exemplary embodiments of hydraulic fluid supply systems are described above in detail. The hydraulic fluid supply systems, and methods of operating such systems and devices are not limited to the specific embodiments described herein, but rather, components of systems and/or steps of the methods may be utilized independently and separately from other components and/or steps described herein. For example, the methods may also be used in combination with other systems requiring hydraulic fluid, and are not limited to practice with only the systems and methods as described herein. Rather, the exemplary embodiment can be implemented and utilized in connection with many other machinery applications that are currently configured to receive and accept hydraulic fluid supply systems.

Example methods and apparatus for supplying hydraulic fluid to an integrated PCM actuator assembly are described above in detail. The apparatus illustrated is not limited to the specific embodiments described herein, but rather, components of each may be utilized independently and separately from other components described herein. Each system component can also be used in combination with other system components.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A variable pitch propeller assembly comprising:
a hub rotatable with a power engine rotor having an axis of rotation;
a plurality of propeller blade assemblies spaced circumferentially about said hub, each propeller blade assembly of the plurality of propeller blade assemblies configured to rotate a respective propeller blade about a radially extending pitch axis of rotation;
a hydraulic fluid port assembly integrally formed and rotatable with the power engine rotor, the hydraulic fluid port assembly comprising at least three hydraulic fluid ports configured to receive respective flows of hydraulic fluid from a stationary hydraulic fluid transfer sleeve at least partially surrounding said port assembly; and
a pitch actuator assembly coupled in flow communication with the at least three hydraulic fluid ports through respective hydraulic fluid transfer tubes extending from said hydraulic fluid port assembly to said pitch actuator assembly.

2. The assembly of claim 1, wherein said at least three hydraulic transfer tubes comprise an increase transfer tube, a decrease transfer tube, and a drain.

3. The assembly of claim 1, wherein said pitch actuator assembly comprises a linear actuation member configured to translate an axial movement driven by at least one of said hydraulic fluid transfer tubes into a rotation about the pitch axis of rotation.

4. The assembly of claim 1, wherein said pitch actuator assembly comprises a rotary actuation member configured to translate a circumferential movement driven by at least one of said hydraulic fluid transfer tubes into a rotation about the pitch axis of rotation.

5. The assembly of claim 1, wherein said hydraulic fluid port assembly is configured to receive respective flows of hydraulic fluid from the stationary hydraulic fluid transfer sleeve in a radial direction.

6. The assembly of claim 1, wherein said hydraulic fluid port assembly is configured to receive respective flows of hydraulic fluid from the stationary hydraulic fluid transfer sleeve in an axial direction.

7. The assembly of claim 1, wherein said pitch actuator assembly is coupled to the plurality of propeller blade assemblies to selectively control a pitch of the propeller blades.

8. The assembly of claim 7, wherein said pitch actuator assembly comprises a transfer range limiter configured to limit a rotation of at least one of said pitch actuator assembly and said plurality of propeller blade assemblies.

9. The assembly of claim 8, wherein said transfer range limiter is configured to cutoff flow to said pitch actuator assembly through said hydraulic fluid transfer tubes.

10. The assembly of claim 8, wherein said transfer range limiter comprises a mechanical transfer range limiter configured to prevent movement of said pitch actuator assembly outside a predetermined range.

11. A variable pitch turbofan gas turbine engine comprising:
- a core engine including a multistage compressor; and
- a fan assembly comprising an axis of rotation and powered by said core engine, said fan assembly comprising:
  - a hub rotatable with a power engine rotor having the axis of rotation;
  - a plurality of propeller blade assemblies spaced circumferentially about said hub, each propeller blade assembly of the plurality of propeller blade assemblies configured to rotate a respective propeller blade about a radially extending pitch axis of rotation;
  - a hydraulic fluid port assembly integrally formed and rotatable with the power engine rotor, the hydraulic fluid port assembly comprising at least three hydraulic fluid ports configured to receive respective flows of hydraulic fluid from a stationary hydraulic fluid transfer sleeve at least partially surrounding said port assembly; and
  - a pitch actuator assembly coupled in flow communication with the at least three hydraulic fluid ports through respective hydraulic fluid transfer tubes extending axially from said hydraulic fluid port assembly to said pitch actuator assembly, said pitch actuator assembly coupled to the plurality of propeller blade assemblies to selectively control a pitch of the propeller blades.

12. The variable pitch turbofan gas turbine engine of claim 11, wherein said at least three hydraulic transfer tubes comprise an increase transfer tube, a decrease transfer tube, and a drain.

13. The variable pitch turbofan gas turbine engine of claim 11, wherein said pitch actuator assembly comprises a linear actuation member configured to translate an axial movement driven by at least one of said hydraulic fluid transfer tubes into a rotation about the pitch axis of rotation.

14. The variable pitch turbofan gas turbine engine of claim 11, wherein said pitch actuator assembly comprises a rotary actuation member configured to translate a circumferential movement driven by at least one of said hydraulic fluid transfer tubes into a rotation about the pitch axis of rotation.

15. The variable pitch turbofan gas turbine engine of claim 11, wherein said hydraulic fluid port assembly is configured to receive respective flows of hydraulic fluid from the stationary hydraulic fluid transfer sleeve in a radial direction.

16. The variable pitch turbofan gas turbine engine of claim 11, wherein said hydraulic fluid port assembly is configured to receive respective flows of hydraulic fluid from the stationary hydraulic fluid transfer sleeve in an axial direction.

17. The variable pitch turbofan gas turbine engine of claim 11, wherein said pitch actuator assembly is coupled to the plurality of propeller blade assemblies to selectively control a pitch of the propeller blades.

18. The variable pitch turbofan gas turbine engine of claim 17, wherein said pitch actuator assembly comprises a transfer range limiter configured to limit a rotation of at least one of said pitch actuator assembly and said plurality of propeller blade assemblies.

19. The variable pitch turbofan gas turbine engine of claim 18, wherein said transfer range limiter is configured to cutoff flow to said pitch actuator assembly through said hydraulic fluid transfer tubes.

20. The variable pitch turbofan gas turbine engine of claim 18, wherein said transfer range limiter comprises a mechanical transfer range limiter configured to prevent movement of said pitch actuator assembly outside a predetermined range.

* * * * *